US012422117B1

(12) United States Patent
Chen

(10) Patent No.: US 12,422,117 B1
(45) Date of Patent: Sep. 23, 2025

(54) LIGHT-EMITTING DEVICE

(71) Applicant: Ming-Ken Chen, Taipei (TW)

(72) Inventor: Ming-Ken Chen, Taipei (TW)

( * ) Notice: Subject to any disclaimer, the term of this patent is extended or adjusted under 35 U.S.C. 154(b) by 0 days.

(21) Appl. No.: 18/988,957

(22) Filed: Dec. 20, 2024

(51) Int. Cl.

| | |
|---|---|
| ***F21S 10/00*** | (2006.01) |
| ***F21S 9/02*** | (2006.01) |
| ***F21V 23/04*** | (2006.01) |
| ***F21V 29/70*** | (2015.01) |
| ***F21V 31/00*** | (2006.01) |

(52) U.S. Cl.
CPC ............... *F21S 10/007* (2013.01); *F21S 9/02* (2013.01); *F21V 23/0471* (2013.01); *F21V 29/70* (2015.01); *F21V 31/005* (2013.01)

(58) Field of Classification Search
CPC ............ G03B 21/2033; G03B 21/2046; G03B 21/206; G03B 21/208; F21W 2121/00; F21S 10/007; F21V 23/0471; F21V 23/0478; F21V 21/406
See application file for complete search history.

(56) References Cited

U.S. PATENT DOCUMENTS

| | | | | |
|---|---|---|---|---|
| 6,133,907 A * | 10/2000 | Liu | G09F 19/18 | 345/182 |
| 11,156,352 B1 * | 10/2021 | Li | H04R 3/00 | |
| 11,435,056 B1 * | 9/2022 | Zhu | F21V 3/049 | |
| 11,662,071 B1 * | 5/2023 | Wang | F21V 5/04 | 362/268 |
| 2012/0081005 A1 * | 4/2012 | Lin | F21S 10/00 | 315/86 |
| 2015/0184844 A1 * | 7/2015 | Zhang | F21V 29/73 | 362/96 |
| 2015/0276178 A1 * | 10/2015 | Chien | G03B 21/001 | 362/95 |
| 2016/0026073 A1 * | 1/2016 | Zhang | G03B 21/2033 | 353/101 |
| 2017/0307965 A1 * | 10/2017 | Sum | A63H 3/006 | |
| 2023/0288789 A1 * | 9/2023 | Chen | G03B 23/105 | |

* cited by examiner

*Primary Examiner* — Alexander K Garlen
(74) *Attorney, Agent, or Firm* — Leong C. Lei

(57) ABSTRACT

Provided is a light-emitting device including a body, light-emitting portion, socket, and battery holder. The body includes two casings fitted together to form therebetween a hollow-core receiving space. The body engages with a handle portion. The light-emitting portion is disposed above the body. The socket has a projection lamp module. The battery holder is disposed below the body, adapted to hold at least one battery, and electrically connected to the projection lamp module and a waterproof plastic switch. The light-emitting device is capable of projection and light emission, is interesting and decorative. The body can contain items therein and thus is practical. The two casings are firmly coupled together and unlikely to be separated. The handle portion is firmly coupled to the body and impossible to fall off. The light-emitting device is capable of automatically sensing light emission and waterproofing to preclude hazards like electrical leakage and electrical shock.

7 Claims, 6 Drawing Sheets

LIGHT-EMITTING DEVICE

TECHNICAL FIELD OF THE INVENTION

The present disclosure relates to light-emitting devices, and more particularly to a light-emitting device that is capable of projection and light emission, interesting, decorative, capable of containing items, and versatile.

BACKGROUND

Human vision can only function when it receives light reflecting off the surroundings. Therefore, "illumination" is of vital importance.

Lamps, the artificial light sources for "illumination," enable human beings to see at night and in darkness, extending human beings' reach in terms of time and space. Human beings' demand for "illumination" is becoming greater because of increasingly higher living standards. Desirably, "illumination" should be interesting and pleasing in addition to its lighting purpose.

However, conventional lamps are not only plain-looking and merely capable of emitting light but also lacking in additional, practical functions. Therefore, the prior art still has room for improvement.

SUMMARY OF THE INVENTION

In view of the aforesaid drawbacks of the prior art, it is an objective of the disclosure to provide a light-emitting device that is capable of projection and light emission, interesting, decorative, capable of containing items, and versatile.

To achieve the above and other objectives, the disclosure provides a light-emitting device comprising a body, a light-emitting portion, a socket, and a battery holder. The body comprises two casings fitted together to form therebetween a hollow-core receiving space, wherein one of the casings has a plurality of jointing posts, and the other casing has a plurality of jointing holes, with a plurality of screw elements penetratingly disposed at the jointing holes and screwed to the jointing posts to fit the two casings together, with an engaging hole disposed on a side of the body and adapted to engage with a handle portion, with two slots disposed on an inner surface of the body. The light-emitting portion is shaped like a hollow-core casing, disposed above the body, and made of a transparent material or an opaque material. The socket has a projection lamp module for projection and light emission and has two sides engaging with the slots. The battery holder is disposed below the body, adapted to hold at least one battery, and electrically connected to the projection lamp module and a waterproof plastic switch. The waterproof plastic switch is disposed on a surface of the body to determine whether the battery holder has to supply power to the projection lamp module. The battery holder has an opening, with a waterproof strip disposed on four sides of the opening, with a battery lid removably disposed at the opening and adapted to press against the waterproof strip.

The light-emitting device has advantageous benefits as follows:

1) The light-emitting device is not only capable of projection and light emission but is also interesting.
2) The body is base-shaped, with one side coupled to a handle portion, allowing the light-emitting device to either lie on a plane steadily or be hung.
3) The body can contain items therein and thus is practical.

4) The two casings are firmly coupled together and unlikely to be separated.
5) The handle portion is firmly coupled to the body and impossible to fall off.
6) The light-emitting device is capable of automatically sensing light emission.
7) The light-emitting device is waterproof to preclude hazards like electrical leakage and electrical shock.
8) The light-emitting device is made of a sun-protection, embrittlement-proof material and is free from discoloration.
9) The light-emitting portion is flame-shaped and thus lively.

Objectives, features, and advantages of the disclosure are herein illustrated with preferred embodiments, depicted with drawings, and described below.

DETAILED DESCRIPTION

The implementation of the disclosure is illustrated below by specific embodiments. Persons skilled in the art can easily understand the other advantages and effects of the disclosure by referring to the contents disclosed herein. Furthermore, the disclosure can also be implemented or applied in any other different specific embodiments. Various modifications and changes can be made to the specific embodiments without departing from the spirit of the disclosure.

Figure 1:
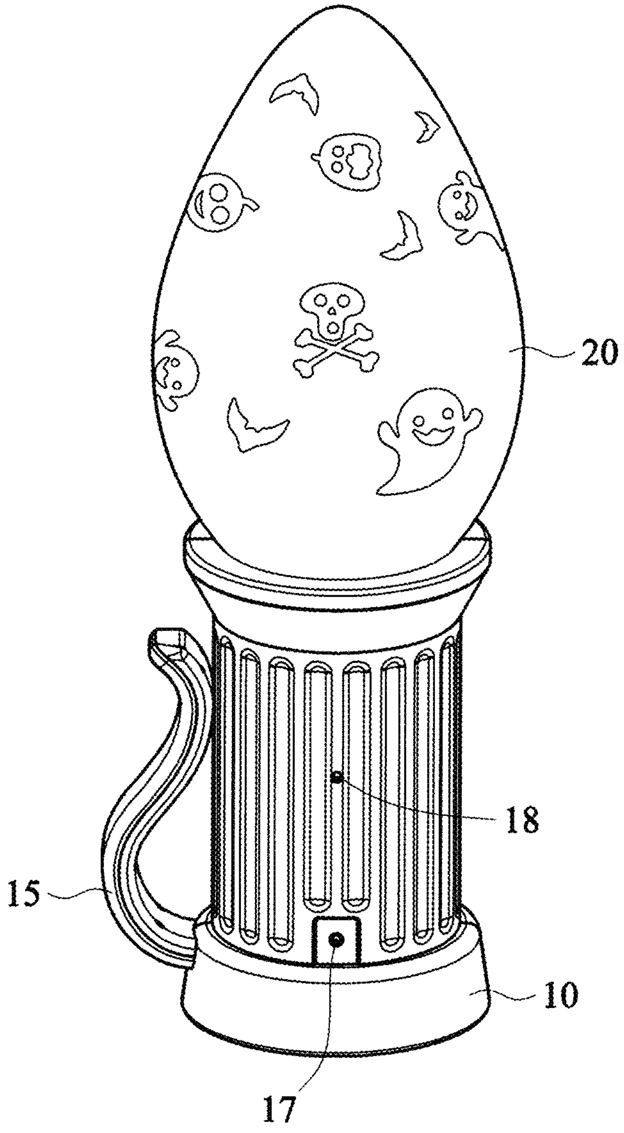
FIG. 1 is a perspective view of a light-emitting device of the disclosure.
Figure 2:
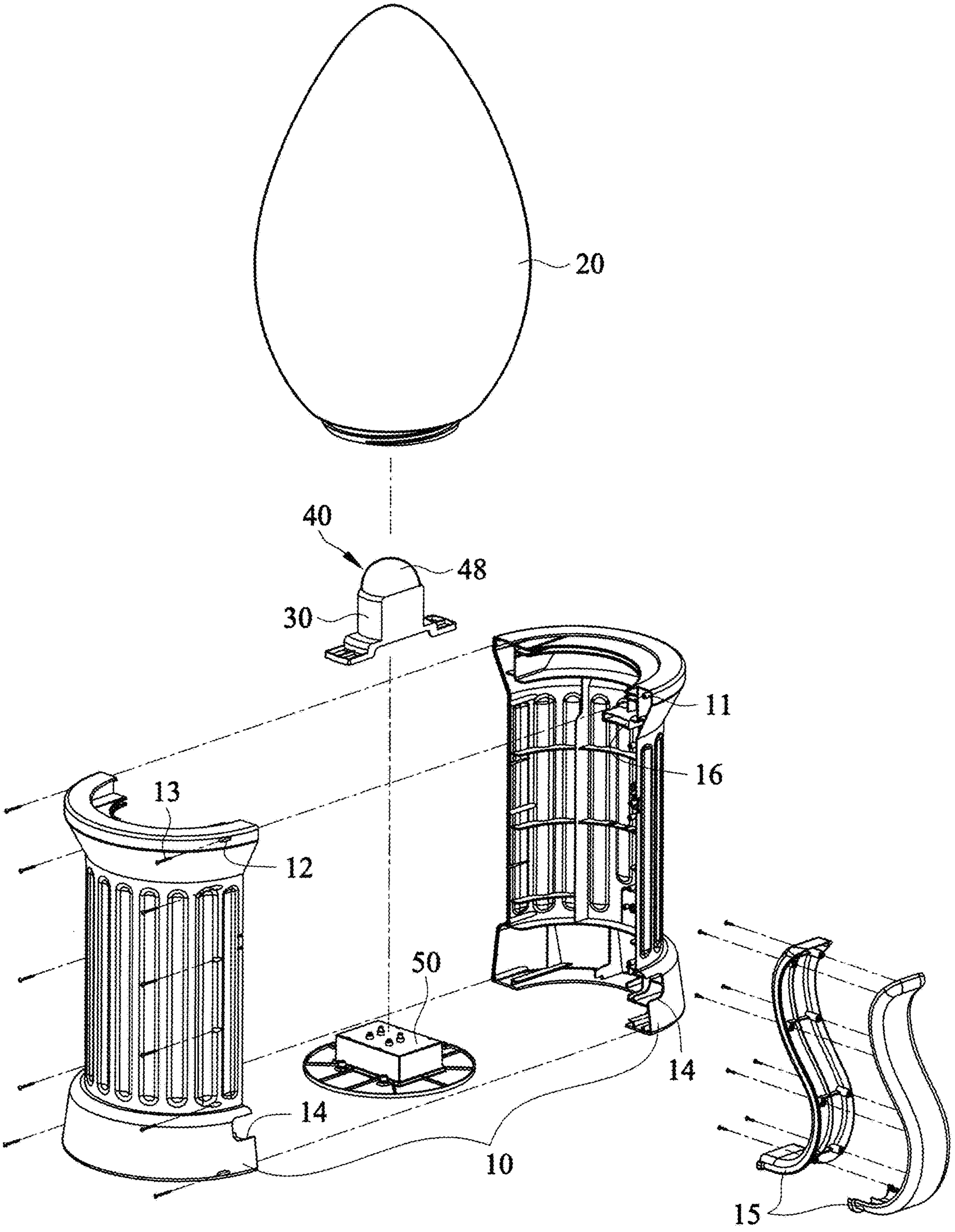
FIG. 2 is an exploded view of the light-emitting device of the disclosure.
Figure 3:
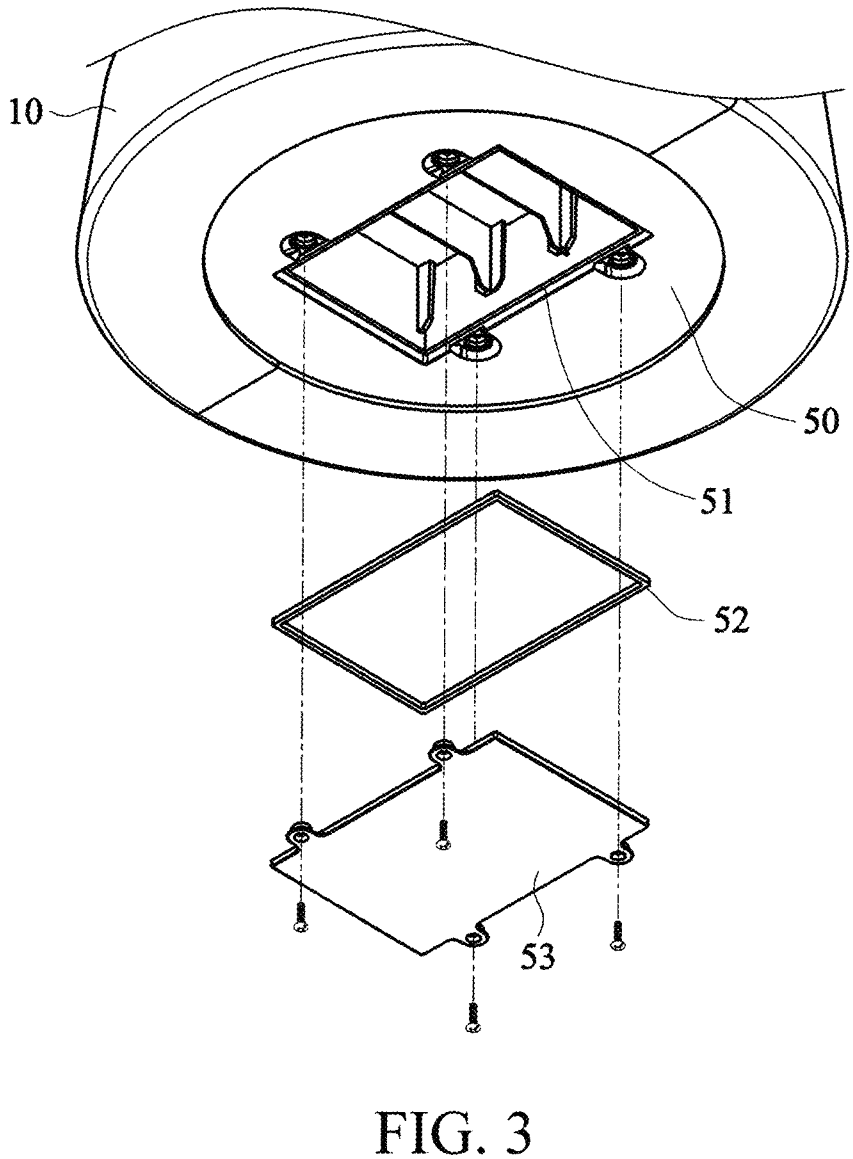
FIG. 3 is an exploded view of a battery holder of the light-emitting device of the disclosure.

As shown in FIG. 1 through FIG. 3, the disclosure provides a light-emitting device comprising a body 10, a light-emitting portion 20, a socket 30 and a battery holder 40 as described below.

The body 10 comprises two casings fitted together to form therebetween a hollow-core receiving space. One of the casings has a plurality of jointing posts 11. The other casing has a plurality of jointing holes 12. A plurality of screw elements 13 are penetratingly disposed at the jointing holes 12 and screwed to the jointing posts 11 to fit the two casings together. An engaging hole 14 is disposed on one side of the body 10 and adapted to engage with a handle portion 15. Two slots 16 are disposed on an inner surface of the body 10. For exemplary sake, this embodiment is exemplified by the slot 16 disposed on one of the casings.

The light-emitting portion 20 is shaped like a hollow-core casing, disposed above the body 10, and made of a transparent material or an opaque material.

The socket 30 has a projection lamp module 40 for projection and light emission. The two sides of the socket 30 engage with the slots 16.

The battery holder 50 is disposed below the body 10, adapted to hold at least one battery, and electrically connected to the projection lamp module 40 and a waterproof plastic switch 17. The waterproof plastic switch 17 is disposed on the surface of the body 10 and adapted to determine whether the battery holder 50 has to supply power to the projection lamp module 40. The battery holder 50 has an opening 51, with a waterproof strip 52 disposed on four sides of the opening 51, allowing a battery lid 53 to be removably disposed at the opening 51 and adapted to press against the waterproof strip 52.

In an embodiment of the disclosure, a sensing switch 17 is disposed on the surface of the body 10, electrically connected to the battery holder 50 and the projection lamp module 40, and adapted to detect presence of a human body, causing the projection lamp module 40 to perform automatic projection and light emission upon affirmative detection of presence of the human body.

In an embodiment of the disclosure, the body 10 and the battery holder 50 are made of a sun-protection, embrittlement-proof material.

In an embodiment of the disclosure, a bottom panel is disposed at the bottom of the body 10 and has an oblique surface and a plurality of water-discharging holes.

Figure 4:
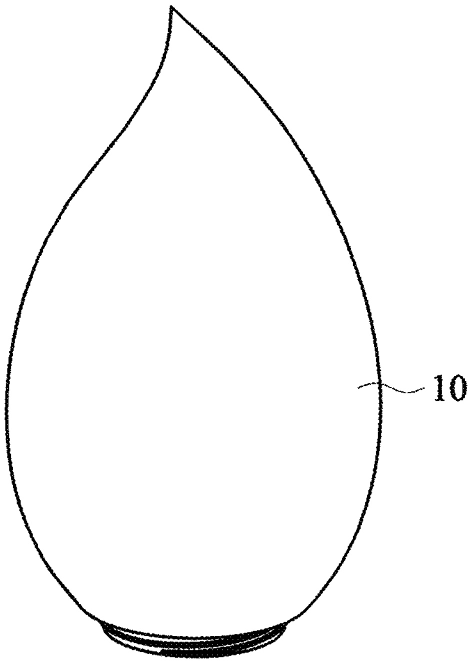
FIG. 4 is a perspective view of a light-emitting portion of the light-emitting device according to another structural embodiment of the disclosure.
Figure 5:
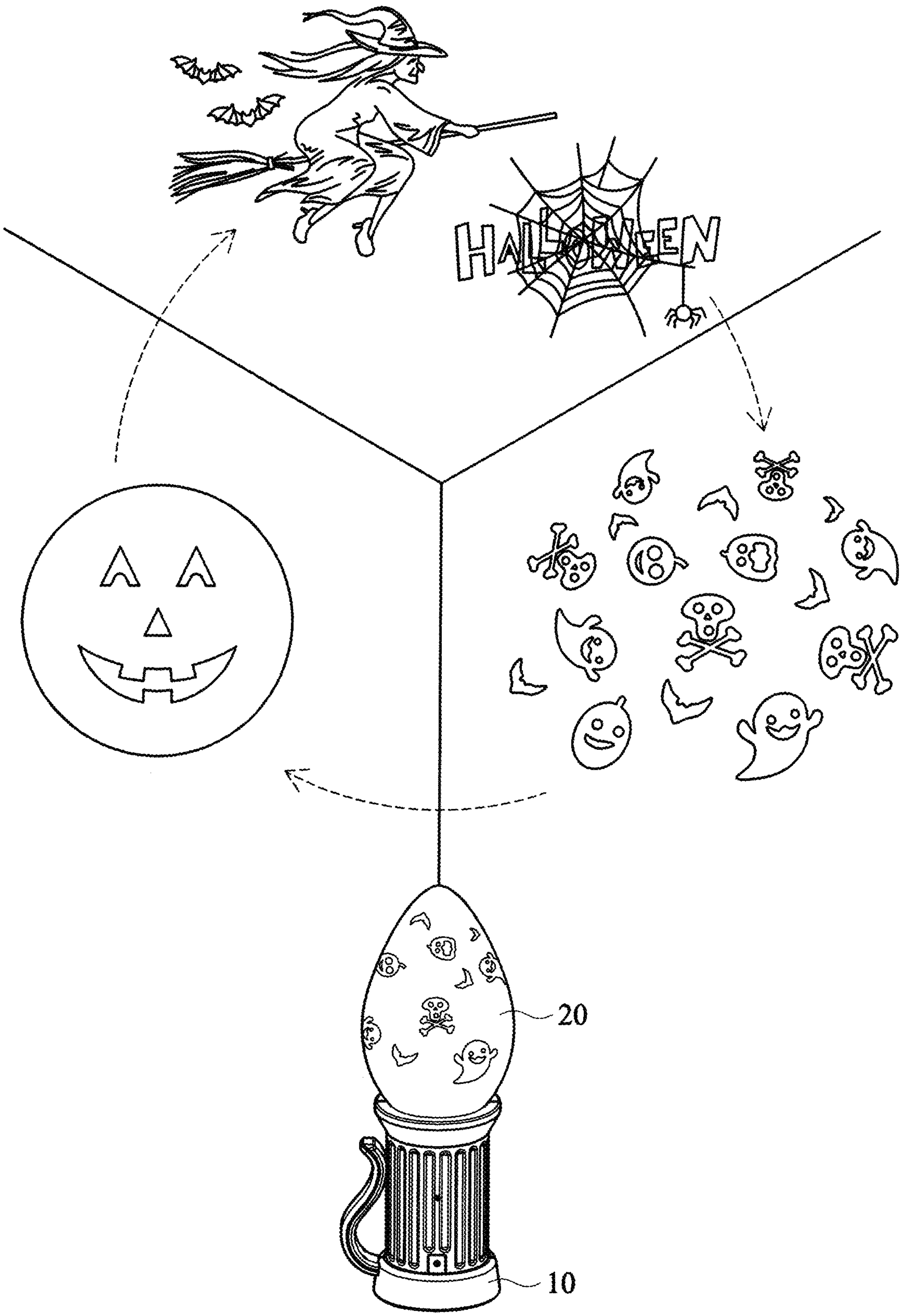
FIG. 5 is a perspective view of how to use the light-emitting device of the disclosure.

As shown in FIG. 4, in an embodiment of the disclosure, the light-emitting portion 20 is flame-shaped.

Figure 6:
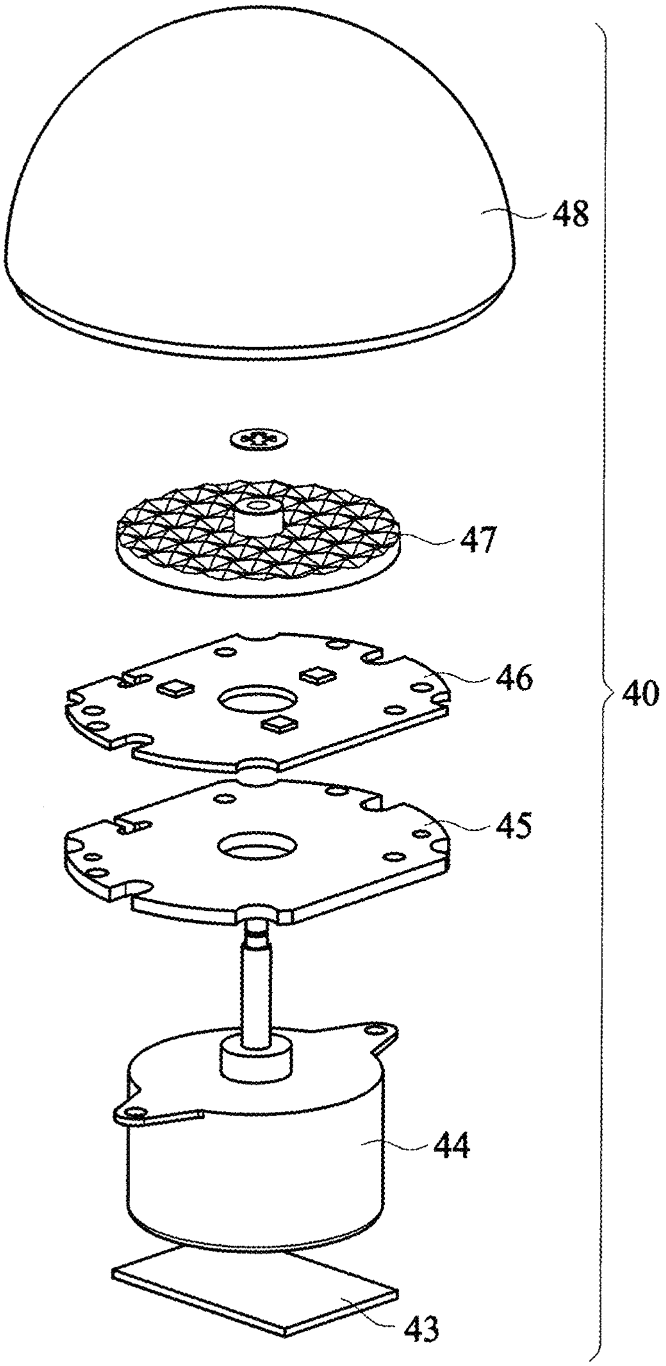
FIG. 6 is an exploded view of a projection lamp module of the light-emitting device of the disclosure.

As shown in FIG. 6, in an embodiment of the disclosure, the projection lamp module 40 comprises a circuit board 43. The circuit board 43 is electrically connected to a light-emitting lamp board 46. A heat sink 45 is disposed below the light-emitting lamp board 46. The heat sink 45 dissipates and reduces heat generated from the light-emitting lamp board 46. A refraction panel 47 is disposed above the light-emitting lamp board 46, with a refraction dome 48 disposed at the socket 30.

Therefore, the light-emitting lamp board 46 externally projects an optical pattern through the refraction panel 47 and the refraction dome 48 while emitting light.

In an embodiment of the disclosure, the heat sink 45, the light-emitting lamp board 46 and the refraction panel 47 are disposed at a rotating shaft of a motor 44 and driven by the motor 44 to rotate to produce a rotating, radiating optical pattern.

In an embodiment of the disclosure, the projection lamp module 40 is electrically connected to a transformer for providing an external electric power source.

The embodiments of the disclosure are described above. Features and advantages of the disclosure are described below.

As shown in FIG. 1, when the light-emitting portion 20 is made of an opaque material, the projection lamp module 40 can project a rotating, radiating optical pattern through the light-emitting portion 20.

As shown in FIG. 6, when the light-emitting portion 20 is made of a transparent material, the projection lamp module 40 can project a rotating, radiating optical pattern onto a wall or ceiling through the light-emitting portion 20.

The light-emitting device has advantageous benefits as follows:

1) The light-emitting device is not only capable of projection and light emission but is also interesting.
2) The body is base-shaped, with one side coupled to a handle portion, allowing the light-emitting device to either lie on a plane steadily or be hung.
3) The body can contain items therein and thus is practical.
4) The two casings are firmly coupled together and unlikely to be separated.

5) The handle portion is firmly coupled to the body and impossible to fall off.
6) The light-emitting device is capable of automatically sensing light emission.
7) The light-emitting device is waterproof to preclude hazards like electrical leakage and electrical shock.
8) The light-emitting device is made of a sun-protection, embrittlement-proof material and is free from discoloration.
9) The light-emitting portion is flame-shaped and thus lively.

The aforesaid embodiments are exemplary and illustrative rather than restrictive of the disclosure. The scope of the claims of the disclosure shall be defined by the appended claims.

What is claimed is:

1. A light-emitting device, comprising:

a body comprising two casings fitted together to form therebetween a hollow-core receiving space, wherein one of the casings has a plurality of jointing posts, and the other casing has a plurality of jointing holes, with a plurality of screw elements penetratingly disposed at the jointing holes and screwed to the jointing posts to fit the two casings together, with an engaging hole disposed on a side of the body and adapted to engage with a handle portion, with two slots disposed on an inner surface of the body;

a light-emitting portion shaped like a hollow-core casing, disposed above the body, and made of a transparent material or an opaque material;

a socket having a projection lamp module for projection and light emission and having two sides engaging with the slots; and a battery holder disposed below the body, adapted to hold at least one battery, and electrically connected to the projection lamp module and a waterproof plastic switch, the waterproof plastic switch being disposed on a surface of the body to determine whether the battery holder has to supply power to the projection lamp module, wherein the battery holder has an opening, with a waterproof strip disposed on four sides of the opening, with a battery lid removably disposed at the opening and adapted to press against the waterproof strip;

wherein the projection lamp module comprises a circuit board electrically connected to a light-emitting lamp board, and a heat sink is disposed below the light-emitting lamp board to dissipate and reduce heat generated from the light-emitting lamp board, with a refraction panel disposed above the light-emitting lamp board, with a refraction dome disposed at the socket.

2. The light-emitting device of claim 1, wherein a sensing switch is disposed on a surface of the body, electrically connected to the battery holder and the projection lamp module, and adapted to detect presence of a human body, causing the projection lamp module to perform automatic projection and light emission upon affirmative detection of presence of the human body.

3. The light-emitting device of claim 1, wherein the body and the battery holder are made of a sun-protection, embrittlement-proof material.

4. The light-emitting device of claim 1, wherein a bottom panel is disposed at the bottom of the body and has an oblique surface and a plurality of water-discharging holes.

5. The light-emitting device of claim 1, wherein the light-emitting portion is flame-shaped.

6. The light-emitting device of claim 1, wherein the heat sink, the light-emitting lamp board, and the refraction panel are disposed at a rotating shaft of a motor and driven by the motor to rotate to produce a rotating, radiating optical pattern.

7. The light-emitting device of claim 1, wherein the projection lamp module is electrically connected to a transformer for providing an external electric power source.

* * * * *